No. 692,695. Patented Feb. 4, 1902.
D. J. MULLEN.
BAG MAKING MACHINE.
(Application filed Apr. 24, 1901.)

(No Model.) 9 Sheets—Sheet 1.

Witnesses

Inventor
Daniel J. Mullen,
By Victor J. Evans, Attorney

No. 692,695. Patented Feb. 4, 1902.
D. J. MULLEN.
BAG MAKING MACHINE.
(Application filed Apr. 24, 1901.)
(No Model.) 9 Sheets—Sheet 2.

No. 692,695. Patented Feb. 4, 1902.
D. J. MULLEN.
BAG MAKING MACHINE.
(Application filed Apr. 24, 1901.)
(No Model.) 9 Sheets—Sheet 5.

WITNESSES:
INVENTOR
Daniel J. Mullen
BY Victor J. Evans
Attorney

No. 692,695. Patented Feb. 4, 1902.
D. J. MULLEN.
BAG MAKING MACHINE.
(Application filed Apr. 24, 1901.)
(No Model.) 9 Sheets—Sheet 8.

Witnesses
Inventor
Daniel J. Mullen
By Victor J. Evans. Attorney

No. 692,695. Patented Feb. 4, 1902.
D. J. MULLEN.
BAG MAKING MACHINE.
(Application filed Apr. 24, 1901.)
(No Model.) 9 Sheets—Sheet 9.

Witnesses
Inventor
Daniel J. Mullen
By Victor J. Evans
Attorney

UNITED STATES PATENT OFFICE.

DANIEL J. MULLEN, OF MIDDLETOWN, OHIO.

BAG-MAKING MACHINE.

SPECIFICATION forming part of Letters Patent No. 692,695, dated February 4, 1902.

Application filed April 24, 1901. Serial No. 57,227. (No model.)

*To all whom it may concern:*

Be it known that I, DANIEL J. MULLEN, a citizen of the United States, residing at Middletown, in the county of Butler and State of Ohio, have invented new and useful Improvements in Bag-Making Machines, of which the following is a specification.

My invention relates to machines for manufacturing bags from a continuous roll or web of paper; the objects being to provide improved mechanism for folding the paper to form a tube, for forming bellows folds in the sides of the tube, for slitting and folding one end of the tube to form a flat bottom for the bag, and for severing the folded tube of paper into proper lengths. These several objects and such others as may be disclosed hereinafter are effected by the mechanism illustrated in the accompanying drawings.

The construction of the improved machine will be fully described in connection with the accompanying drawings, and its novel features will be particularly pointed out in the appended claims.

In the drawings, Fig. 7 is a plan view of a portion of the machine. Fig. 8 is a plan view of another portion of the machine. Fig. 12 is a perspective view of a part of the mechanism shown in Fig. 11. Fig. 12$^a$ is an enlarged detail perspective view showing the manner of jointing the rods which connect the folding-fingers with the operating-cranks.

Figure 9:
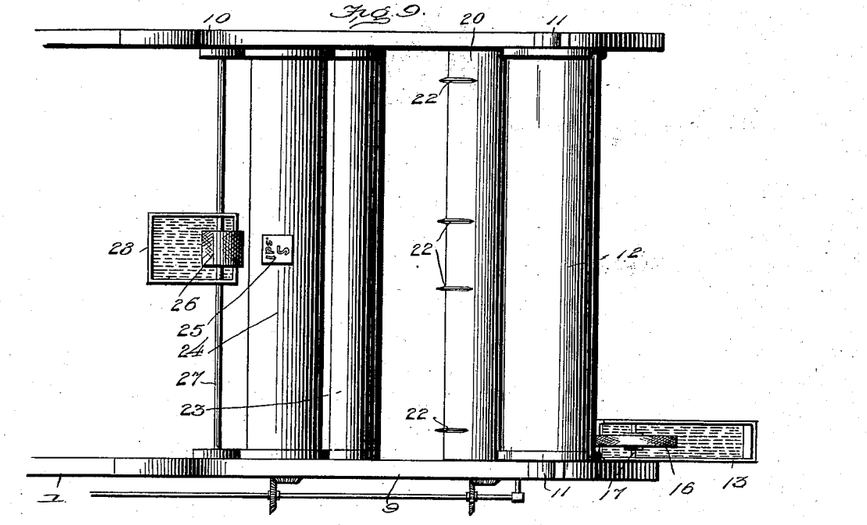
Fig. 9 is a plan view of another portion of the machine not shown in Figs. 7 and 8.
Figure 10:
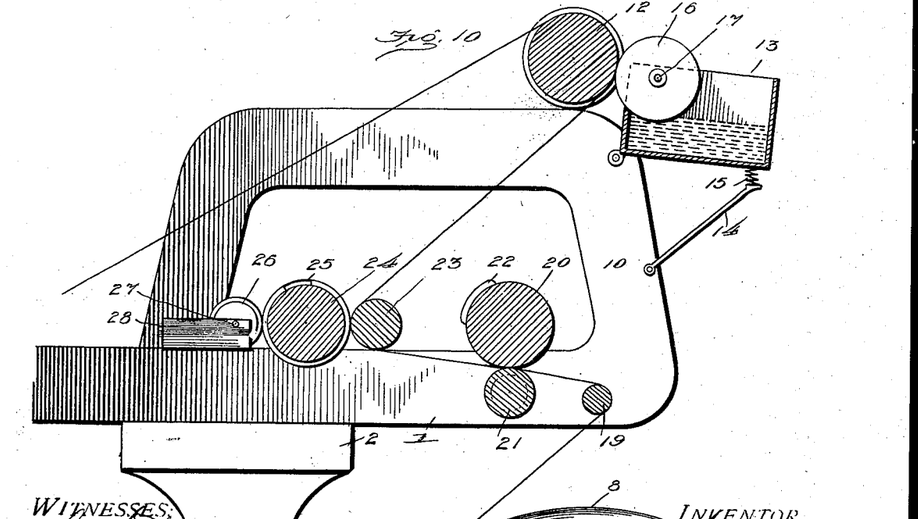
Fig. 10 is a central vertical section of Fig. 9.
Figure 11:
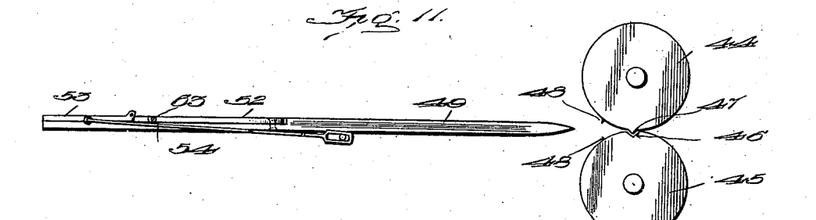
Fig. 11 is a detail side elevation of a part of the mechanism for imparting the final folds to the blank.
Figures 12, 12A:
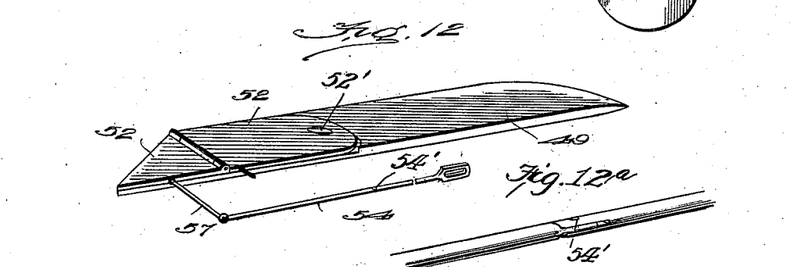

The reference-numeral 1 designates a bed-plate supported upon standards 2, 3, and 4. From the front of each of the standards 2 projects a horizontal arm 5, carrying a U-shaped bracket 6, said brackets serving as bearings for a roller 7, carrying a roll or web 8 of paper. From the front end of the bed-plate 1 project parallel brackets 9 and 10, each having a vertical arm 11 formed with a bearing, said bearings supporting a roller 12. Pivotally secured to the inner side of the bracket 9 is a box 13, adapted to contain paste or other adhesive liquid. The outer side of this box is supported upon an arm 14, projecting from the bracket 9, a coil-spring 15 being interposed between the upper end of said arm and the under surface of the box. The spring serves to support the box and hold the paste-roller 16 against the web, as shown in Figs. 9 and 10.

The feed-roller 16 is mounted upon a shaft 17, supported in bearings formed in the sides of the box, and said roller has peripheral frictional contact with the roller 12, supported in bearings 18, formed in the arms 11 of the brackets 9 and 10.

Figure 1:
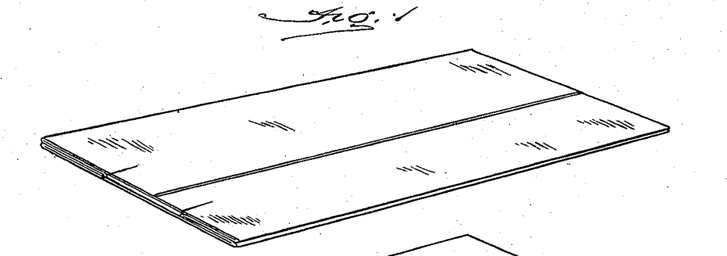
Figures 1, 2, 3, 4, and 5 are perspective views of a paper-bag blank, showing the various folds and progressive steps in the development of the completed bag.
Figures 2, 3, 4, 5:
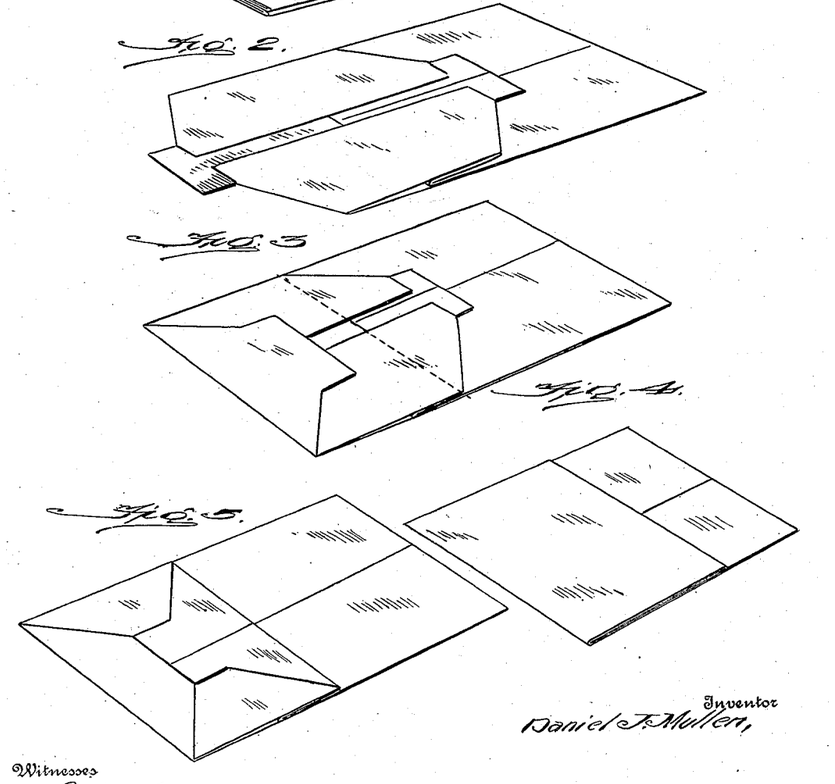
Figure 4:
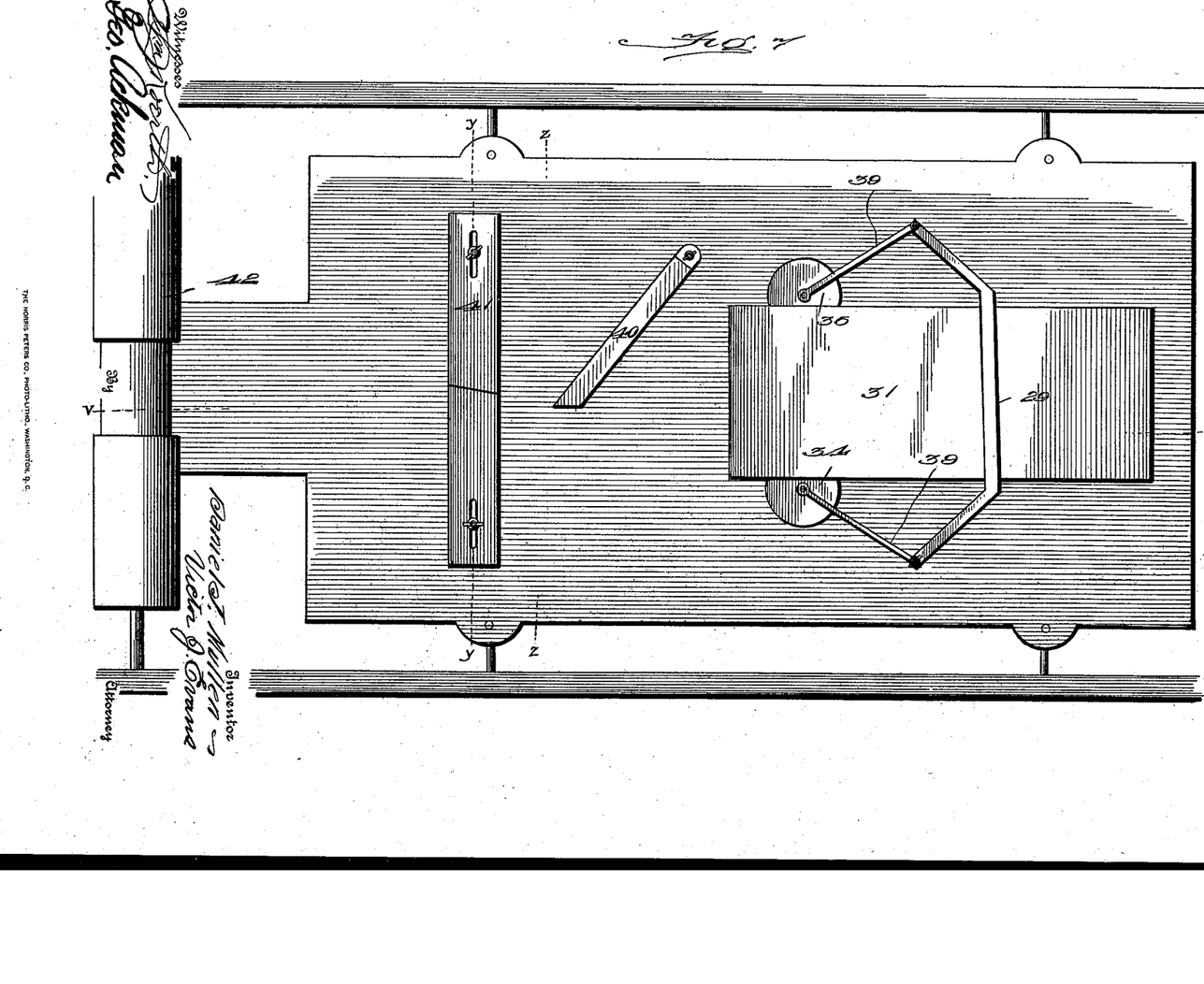
Figure 6:
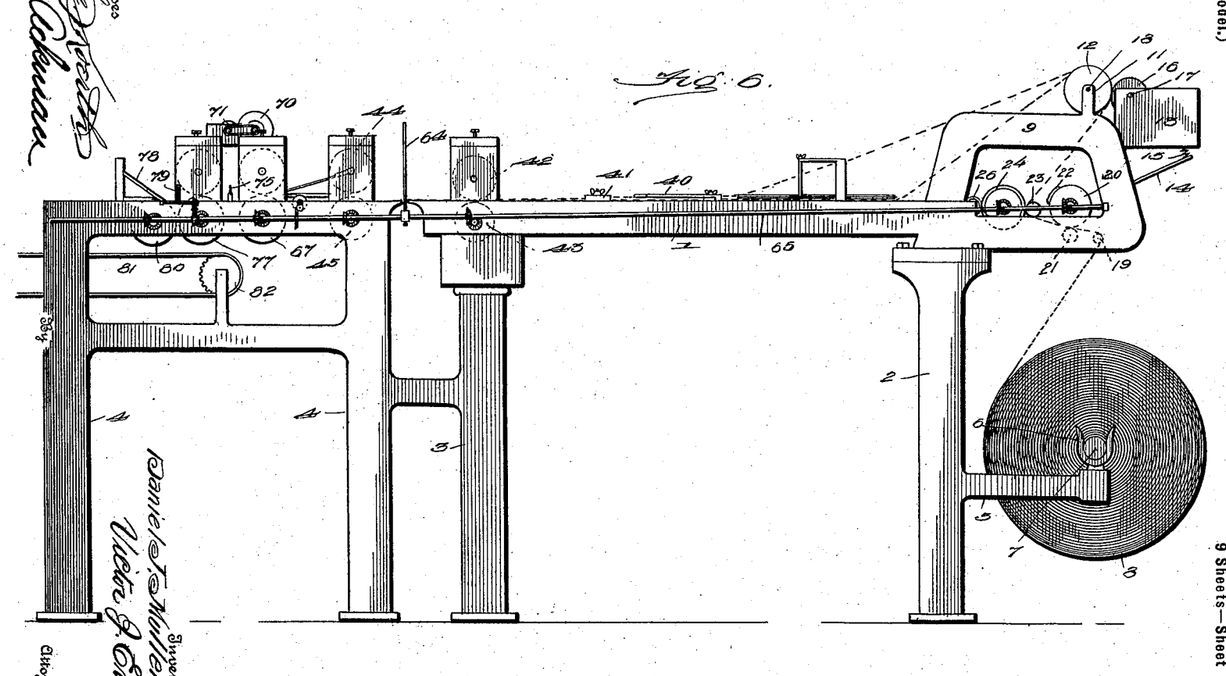
Fig. 6 is a side elevation of a machine embodying the invention.
Figures 13, 14, 15:
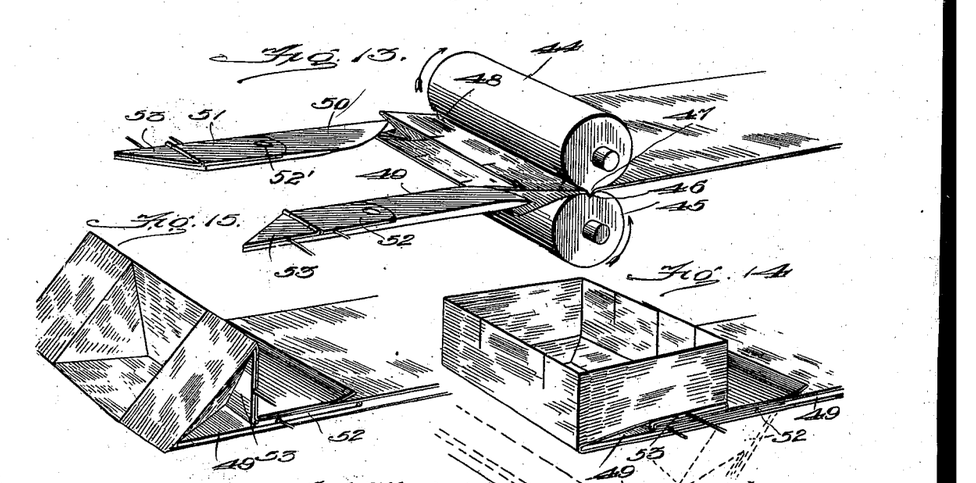
Fig. 13 is a perspective view of the mechanism shown in Fig. 11 with the bag in position thereon.
Fig. 14 is a view in perspective of the bottom end of the bag after the same has been slitted and folded to rectangular form.
Fig. 15 is a perspective view showing the rectangular end folded.
Figures 16, 17:
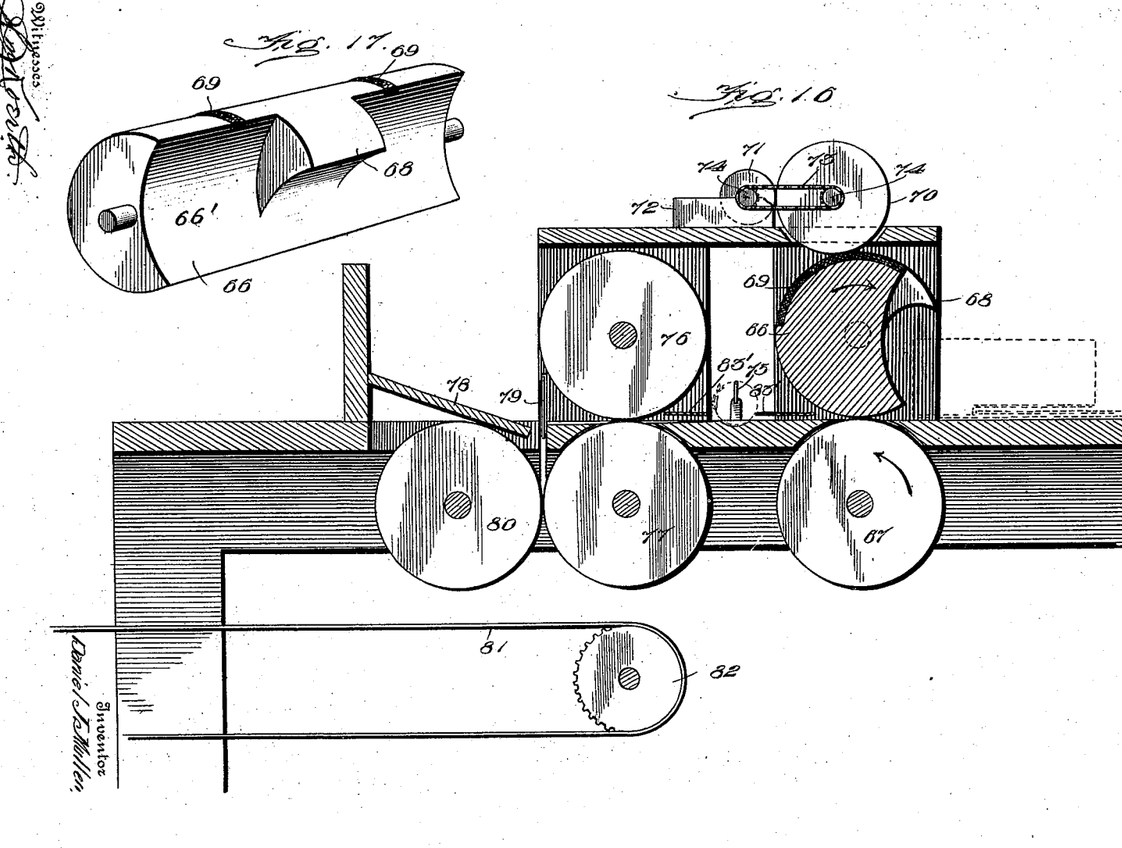
Fig. 16 is a vertical section of the mechanism at the rear end of the machine for effecting the final step in the folding and sealing of the bag.
Fig. 17 is a view in perspective of the roll for sealing the flaps at the bottom end of the bag.
Figures 18, 21, 22:
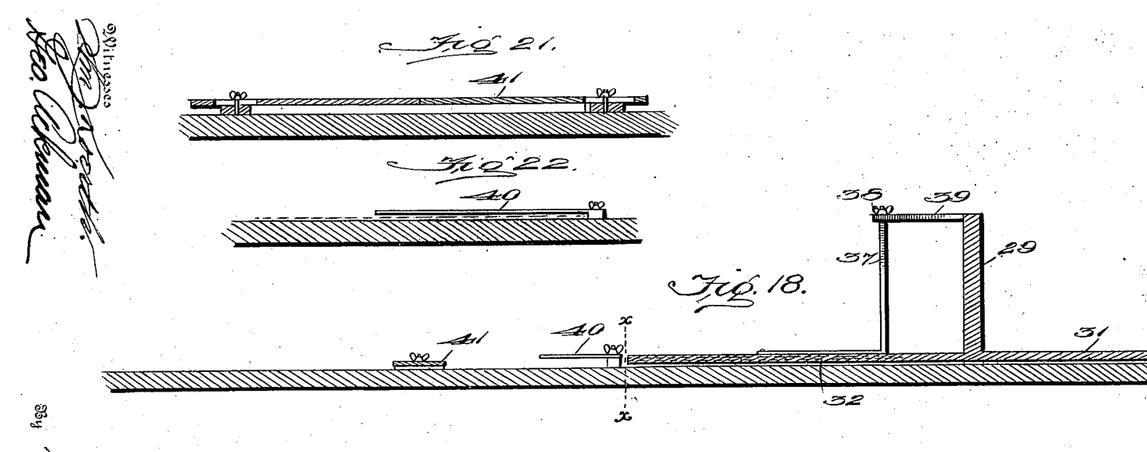
Fig. 18 is a vertical section on the line $vv$ of Fig. 7.
Fig. 21 is a cross-section on the line $yy$ of Fig. 7.
Fig. 22 is a cross-section on the line $zz$ of Fig. 7.
Figure 19:
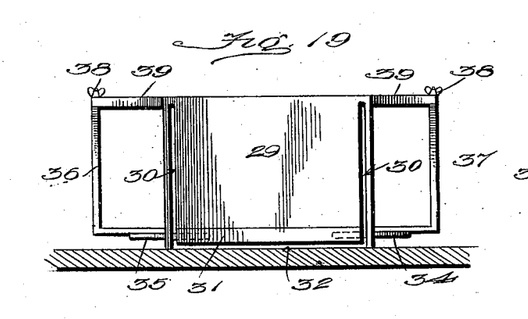
Fig. 19 is a cross-section on the line $ww$ of Fig. 18.
Figure 20:
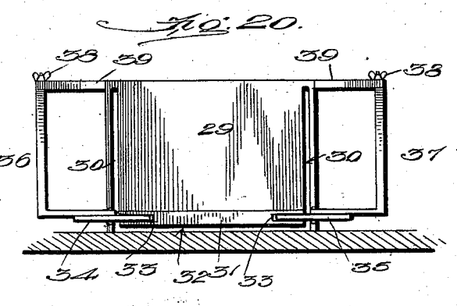
Fig. 20 is a cross-section on the line $xx$ of Fig. 18.
Figure 23:
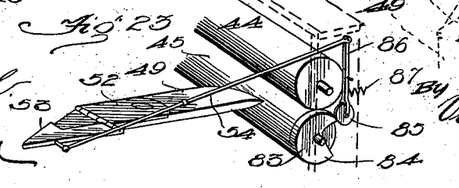
Fig. 23 is a detail perspective view showing another form of gearing for actuating the bottom-folding fingers.
Figure 24:
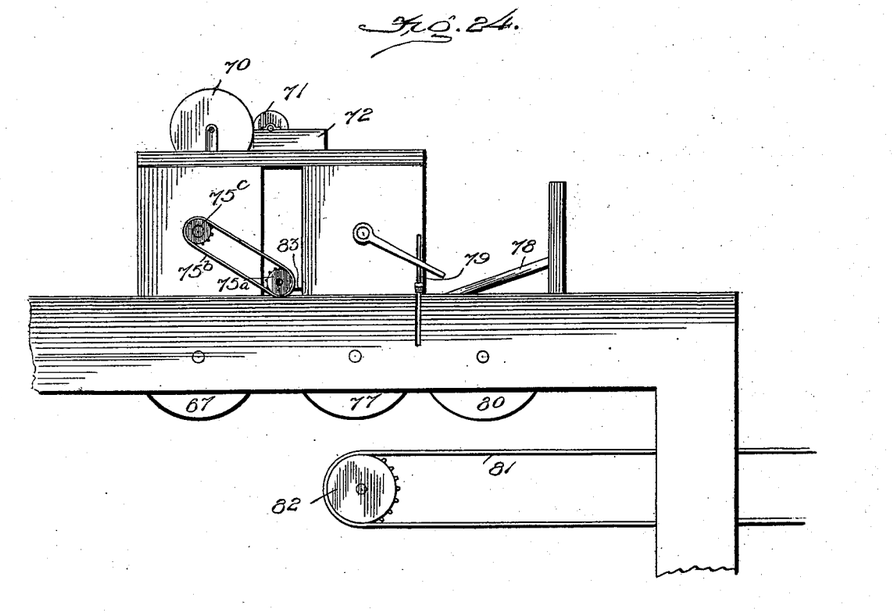
Fig. 24 is a side elevation of a portion of the machine illustrated in Fig. 16 looking from the opposite side and showing the manner of driving the rotary flap-lifter.
Figure 25:
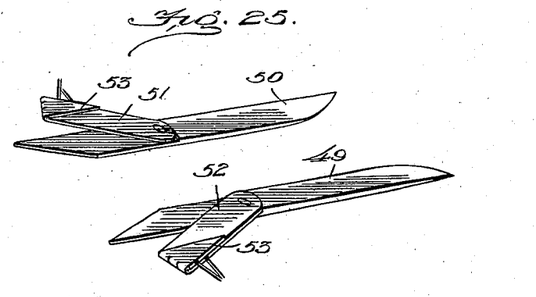
Fig. 25 is a detail view showing one of the folding members withdrawn or moved outward.

The end of the web of paper first passes over a guide-roller 19, supported in bearings in the sides of the bed-plate, and then between two parallel rolls 20 and 21, arranged one above the other. The upper roll 20 carries peripheral knives 22, adapted to slit the paper, as will be referred to more fully hereinafter. After passing between the rolls 20 and 21 the paper passes between parallel rolls 23 and 24, mounted in bearings in the sides of the bed-plate frame. The roll 24 carries a type-block 25, adapted to be inked by an inking-roller 26, carried by a shaft 27, arranged parallel to the roll 24, and receiving a supply of ink from a reservoir 28, mounted centrally of the width of the bed-plate. From the roller 23 the paper passes around the roll 12 and thence rearward to a former comprising a vertical plate 29, formed with parallel vertical slots 30, and a base 31, having edge channels 33, said base being suspended from the lower end of the plate 29, leaving a space 32 between the base and the bed-plate. The sides of the paper pass through the slots 30, thus bending the sides up, as indicated by dotted lines in Fig. 6. In rear of the plate 29 are two rollers 34 and 35, mounted upon the lower ends of oppositely-disposed L-shaped hangers 36 and 37, depending from and adjustably secured, by means of thumb-screws 38, to rearwardly-diverging bracket-arms 39, projecting from the sides of the plate 29. The horizontally-disposed rollers 34 and 35 project into the edge grooves of the base 32 of the former and operate to crease the sides of the paper. The side edges of the paper are then folded over the rear portion of the base-plate by hand, so that the paper or blank assumes the shape shown in Fig. 1. The paper is then drawn rearward, and the folding-finger 40 engages the adjacent side of the paper and turns the same inward and downward, and in its further rearward movement the paper passes under a second sectional folding-blade 41, which folds the opposite side of the paper inward and downward and at the same time holds the previously-folded side down. The blade 41 is close to the bed of the machine, and thereby serves to crease the sides of the folds, and the paper then passes between a pair of creasing and drawing or feeding rolls 42 and 43 to a pair of creasing-rolls 44 and 45, one of which is formed with a longitudinal depression 46 and the other with a longitudinal creasing-rib 47 and spurs 48. The creasing-roller serves to define the line on which the blank is subsequently folded. The spurs grasp the blank and cause it to feed between the rolls 44 and 45. Upon emerging from these creasing-rolls parallel blades 49 and 50 enter the side creases of the blank, as shown in Fig. 13, spreading the side folds of the paper tube partially open, as illustrated in said figure. The further rearward movement of the blank brings it in position to be operated upon by a pair of fingers 51 and 52, pivotally secured at 52′ to the blades 49 and 50, and having hinged extensions 53 of triangular shape, which have both a folding movement and a laterally-swinging movement to bend the corners of the square portion of the blank, so that the latter will assume the shape shown in Fig. 14 of the drawings, the slits formed in the edges of the blank forming square flaps by which the bag-bottom may be better closed. Each rod 54 is provided with a hinge-joint at 54′ intermediate its ends. The lateral movement of the fingers 51 and 52 is effected through the medium of drums 58 and 59, mounted on opposite sides of the bed-plate frame upon stud-journals 60. These drums are each formed with a cam-groove 61, within which travel heads 62, formed on the ends of rods 63, projecting from the fingers 51 and 52. Between the pair of rolls 42 and 43 and the pair 44 and 45 is arranged a breaker or knife 64, carried by a shaft 65, supported in bearings at the side of the bed-plate. The knife extends across the bed-plate and is adapted to sever the blank or tube after it has been caught between the creasing-rolls 44 and 45, the raising and lowering of the knife through the revolution of the shaft 65 being so timed as to insure the proper and uniform length of the bags. After the blank, folded to the position shown in Fig. 2, passes the finger extensions 53 it passes between the rolls 66 and 67, the upper one of which is recessed or hollowed out along one side to form a longitudinal depression or gutter 66′ and a central bill or lip 68, and carries parallel strips or pads 69, set in transverse grooves in its outer periphery and extending only part way around the roll 66, for applying adhesive material to the sides. The bill or lip 68 grasps the nearest edge of the partially-folded blank between the parallel slits, and by a pulling action it straightens out the blank, as illustrated in Fig. 2, the blank or tube being pressed flat as it passes between the rolls 66 and 67. At the same time paste is applied to the end flaps of the bag-bottom by the strips or pads 69, to which paste is supplied by one or more rollers 70, operating in frictional and sliding contact with other rollers 71, revolving within a paste-receptacle 72 on the machine-frame geared to the rollers 70 by means of a chain 73 and sprocket-wheels 74. The surface speed of roller 70 is greater than that of roller 71, so as to wipe the paste off roller 71 and deliver it to the pads of the roller 66. In the further movement of the blank the latter comes in contact with a rotary flap-lifter 75, which raises the projecting flap (shown in Fig. 2) just as the blank reaches a pair of presser-rolls 76 and 77, arranged one above the other, as shown in Fig. 16. The rotary lifter 75 is in the form of a crank-arm, and the shaft portion thereof is mounted in suitable bearings on the machine-frame and provided at one side of the machine with a pulley 75$^a$, which receives motion by means of a belt 75$^b$, passing around another pulley 75$^c$ on the extended shaft of the roll 68, although said driving-belt may pass around a pulley on the shaft of any one of the adjacent rolls. The lifter 75 revolves between a pair of guard-plates 83′, one of which holds down the blank while the lifter 75 is operating on one of the bottom-flaps, the other guard-plate holding down the flap after it has been folded. These presser-rolls bend down a portion of the blank, which then assumes the shape shown in Fig. 3. After passing the rolls 76 and 77 the partially-formed bag is fed upon an inclined table 78, and just at the proper time a folder-arm 79 bends the bag on the dotted line shown in Fig. 3 and tucks the same downward between the end of the bed-plate and table 78, between the roller 77 and another presser-roll 80, arranged behind the roller 77. The tucker or folder arm 79 is in the form of a lever fulcrumed intermediate its ends on the machine-frame, and said tucker-arm may either be operated by a cam or by another arm or sweep 79', connected with the shaft of one of the pressure-rolls, as 76. The rolls 77 and 80 press the bag flat into the shape shown in Fig. 4, causing the outer bottom-flaps of the bag to adhere to the inner bottom-flaps. After the paste has dried the bottom may be straightened out into the position shown in Fig. 5, which represents the completed bag ready for packing and shipment. The bags drop from the rolls 78 and 80 upon a delivery-belt 81, actuated by a driving-wheel 82, and are conveyed to any desired point.

All of the rolls which operate at different stages on the paper tube, blank, and bag derive their motion from the side or longitudinal shaft 65, which, in fact, constitutes the main driving-shaft of the machine. The paper is drawn from the supply-roll 8 by the drawing or feeding rollers 42, 43, 44, and 45, and after the breaker 64 severs the blank into bag lengths the tube-sections are fed along by the succeeding sets of creasing, pasting, and presser rolls until delivered in the form of complete bags. In order to impart a quick movement to the folding-fingers 53, I provide a cam 83 on the end of the roller 45, said cam having a notch 84 to receive a roller 85 on the lower end of a lever 86, fulcrumed at a point intermediate its ends on the machine-frame and having its upper end pivotally connected to the rod 54, which connects at its opposite end to an arm 57, extending laterally from the adjacent finger extension 52 or 53, as the case may be. A spring 87 is arranged to bear against the lever 86, so as to hold the roller toward the cam. As the cam revolves, at a certain point in its revolution the roller 85 will enter the notch 84, and thereby operate the connecting-rod 54, quickly swinging the finger extension 53 and forming the described fold in the bottom of the bag. The arrangement just described is preferred, for the reason that the finger extensions are quickly withdrawn from engagement with the bag at the proper moment.

Having thus fully described my invention, what I claim as new, and desire to secure by Letters Patent, is—

1. In a paper-bag machine, the combination with paper feeding, folding and pasting mechanism, of a paper-guide consisting of an upstanding plate having parallel guide-slots, oppositely-projecting bracket-arms, a horizontal former supported thereby and consisting of a plate having its opposite side edges grooved, rotary tucking-rollers working in the grooves of the former, and elbow-hangers adjustably connected to the bracket-arms of the upstanding plate and having the tucking-rollers journaled thereon.

2. In a paper-bag machine, the combination with the paper-web feeding and folding mechanism, of parallel stationary blades extending lengthwise of the machine and arranged to partially open the tucked side folds of the tube or blank, laterally-swinging fingers pivotally connected to the rear ends of said blades, folding wedge-shaped extensions hinged on transverse axes to the fingers, and cam-operated connections for vibrating said fingers laterally with respect to the movement of the paper tube or blank.

3. In a paper-bag machine, the combination with the paper-web feeding and folding mechanism, of parallel stationary tuck-opening blades extending longitudinally of the machine-frame, laterally-swinging fingers pivotally connected to the rear ends of said blades, triangular extensions hinged to the fingers, an operating cam-shaft, jointed connecting-rods operated by the cam-shaft and attached to the extensions for reversing the latter, and means for simultaneously swinging the fingers and extensions laterally with respect to the movement of the paper.

4. In a paper-bag machine, the combination with paper-web feeding and folding mechanism, of a creasing and pasting roller provided with one or more paste-carrying pads and a centrally-arranged lip for engaging and drawing down one of the bag-bottom flaps and applying adhesive material thereto.

5. In a paper-bag machine, the combination with paper-web feeding and folding mechanism, of creasing-rollers arranged one above the other, the upper roller being partially cut away on its outer surface and provided centrally of the cut-away portion with a lip for drawing down one of the bag-bottom flaps.

6. In a paper-bag machine, the combination with paper-web feeding and folding mechanism, of a pair of rolls between which the paper passes, one of said rolls being concaved at one side of its axis and having parallel paste-applying strips extending part way around its concentric outer surface for laying adhesive material on the bottom-flaps of the bag, a centrally-arranged lip for engaging and drawing down one of the bottom-flaps of the bag, a paste-conveying roll, and a paste-receptacle.

7. In a paper-bag machine, the combination with paper-web feeding and folding mechanism; of a pair of rolls between which the paper passes, one of said rolls constituting the paste-applying roll and having parallel paste-applying strips, a paste-supply roll, and a paste-conveying roll lying between and in contact with the paste applying and supply rolls and geared to the supply-roll in such manner that the supply and conveying rolls are driven at different surface speeds, substantially as described.

8. In a paper-bag machine, the combination with paper-web folding and feeding mechanism, of presser-rolls, a rotary flap-lifter, and stationary guard-plates at opposite sides of the flap-lifter for holding down the blank and flap, the adjacent edges of the guard-plates being spaced apart to accommodate the rotary movement of the flap-lifter.

In testimony whereof I affix my signature in presence of two witnesses.

DANIEL J. MULLEN.

Witnesses:
JAMES A. QUINN,
CHARLES A. KRAMER.